Nov. 27, 1928.
C. J. SCANLAN
1,692,869
ELECTRIC WATER HEATER
Filed Oct. 23, 1925
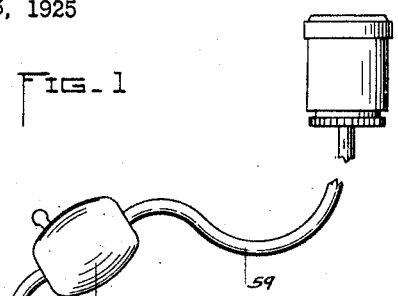
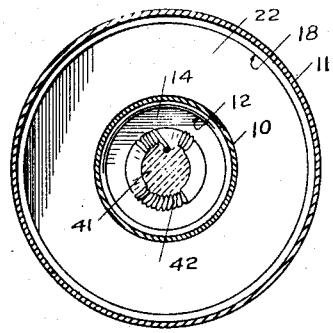
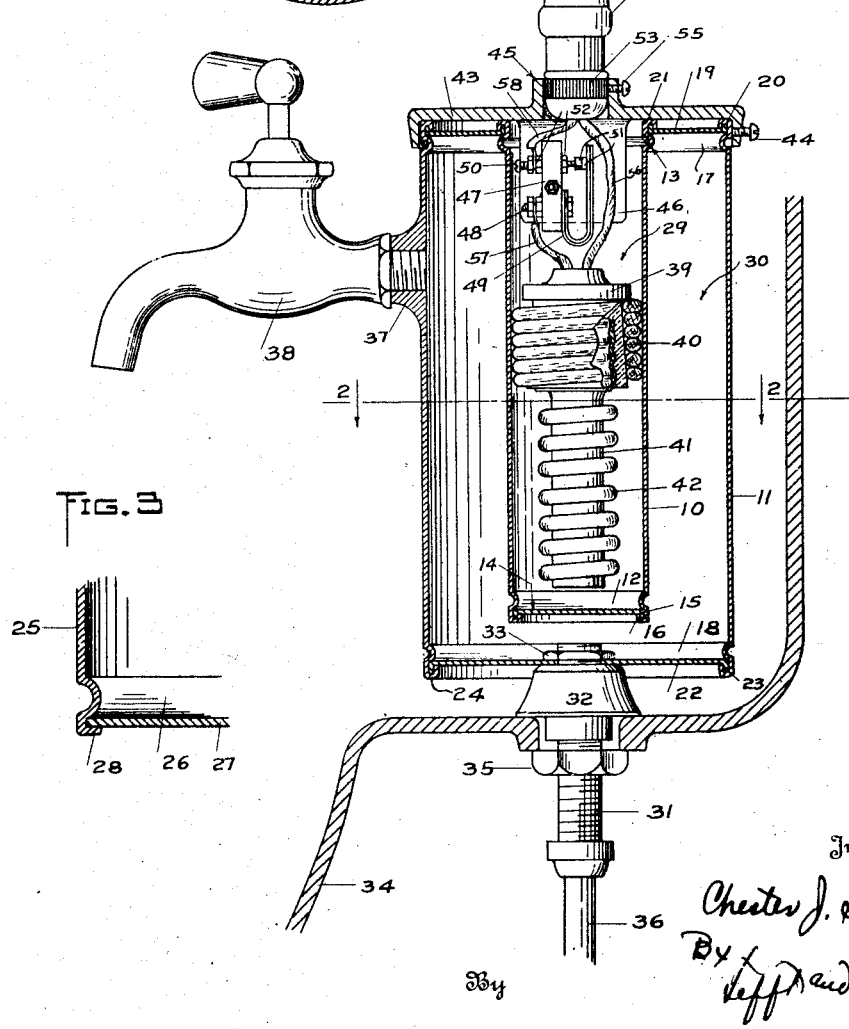
Inventor
Chester J. Scanlan
By
Attorney Patented Nov. 27, 1928.

1,692,869

UNITED STATES PATENT OFFICE.

CHESTER J. SCANLAN, OF BLOOMINGTON, ILLINOIS.

ELECTRIC WATER HEATER.

Application filed October 23, 1925. Serial No. 64,309.

This invention relates to an improved electric water heater and seeks, among other objects, to provide a simple and efficient device of this character which may be readily attached to a supply pipe at a bowl or sink for heating small quantities of water for domestic use.

The invention seeks, as a further object, to provide a device utilizing radiant heat for heating the water, and embodying an inner heating chamber entirely surrounded, except at its upper end, by a chamber for containing the water to be heated, so that practically all of the heat radiated will be conserved for heating the water.

Still another object of the invention is to provide a device wherein the energization of the heating element employed will, by means of a thermostat, be indirectly controlled by the water temperature, but wherein no portion of the heating element or associated parts will be brought directly in contact with the water.

And the invention seeks, as a still further object, to provide a device embodying a novel casing structure adapted to withstand the stresses set up by expansion and contraction of the metal, wherein the electrical parts of the device will be effectively housed and protected from moisture, and wherein said parts may all be removed with the cover of the device, so that access may be readily had to said parts.

Other objects of the invention not specifically mentioned in the foregoing, will appear during the course of the following description.

In the accompanying drawings:

Figure 1 is a vertical sectional view showing my improved heater applied, parts being illustrated in elevation.

Figure 2 is a transverse horizontal sectional view on the line 2—2 of Figure 1, looking in the direction indicated by the arrows.

Figure 3 is a fragmentary sectional view showing a modified form of casing joint.

In carrying the invention into effect, I employ a cylindrical inner casing 10, and a surrounding cylindrical outer casing 11 concentric to the inner casing and somewhat longer. Both casings are preferably formed of copper tubing and the outer casing is also preferably nickeled externally for reducing thermal losses. The casing 10 is rolled near its ends to produce an internal annular bead 12 adjacent the lower end of said casing and an external annular bead 13 adjacent the upper end of said casing. Snugly fitting within the lower end of the casing 10 to rest against the bead 12 is a lower end plate 14 having a peripheral downturned flange 15, and formed from the lower margin of said casing is a channel-shaped flange 16 tightly embracing the flange 15 to provide a closed joint between the casing and said end plate. The upper end of the casing 10 is open and lies flush with the upper end of the casing 11.

The casing 11 is likewise rolled to produce internal annular beads 17 and 18 adjacent the ends of said casing, and fitting in the upper end of said casing to snugly surround the casing 10 is an upper end plate 19 abutting the bead 13 of the latter casing and the bead 17 of the former casing. This plate is provided at its inner and outer peripheries with upturned annular flanges 20, and formed from the upper margins of the casings 10 and 11 are channel-shaped flanges 21 tightly embracing said first mentioned flanges to provide closed joints between the casings and the said end plate. Thus, as will be perceived, the casing 10 is supported within the casing 11 by the end plate 19. Fitting within the lower end of the casing 11 is a lower end plate 22 which abuts the bead 18 and is provided with a peripheral downturned annular flange 23, and formed from the lower margin of said casing is a channel-shaped flange 24 tightly embracing the flange 23 to provide a closed joint between the casing and said end plate. As will be observed, the joints between the several end plates and the casings are all alike and it has been found that this type of joint will withstand the stresses set up by the expansion and contraction of the metal of the casings and end plates. However, a joint as illustrated in Figure 3 may be employed. In this figure, one of the casings is typically illustrated at 25. This casing is rolled to provide an annular bead 26, and fitting in the casing to rest against said bead is an end plate 27. Formed from the adjacent end margin of the casing to engage over said end plate is an annular flange 28, and this flange is preferably soldered to the plate to insure the provision of a closed joint between the casing and end plate.

It is now to be observed that the casing 10 provides a heating chamber 29 while the casing 11 provides a water chamber 30 entirely surrounding the heating chamber except at the upper end thereof, and extending through the lower end plate 22 axially of the casing 11 to communicate with said water chamber, is a tail piece 31. This tail piece is provided with a shoulder 32, and screwed upon the upper end of the tail piece to coact with the end plate 22 at its inner side is a nut 33 clamping the tail piece in position. In Figure 1 of the drawings, I have shown my improved heater mounted upon a conventional wash bowl 34. This bowl is provided with the usual opening to accommodate the tail piece 31 so that the shoulder 32 of the tail piece rests against the bowl at its upper side, and screwed upon the tail piece to abut the lower side of the bowl is a nut 35 rigidly connecting the tail piece with the bowl for firmly supporting the heater upon the bowl. Screwed over the lower end of the tail piece 31 is a coupling sleeve 36 to which a water supply pipe may be attached in the usual manner, and formed on the forward side of the casing 11 near its upper end is a nipple 37 into which is screwed an appropriate faucet 38. Thus, water entering the chamber 30 of the heater through the tail piece 31 may be drawn off at the faucet. Disposed within the heating chamber 29 is a socket 39 which is preferably of porcelain, and wound about said socket is a length of asbestos rope 40 forming a yieldable insulating jacket frictionally coacting with the casing for sustaining the socket as well as preventing the collection of moisture within the casing. Screwed into the socket 39 is a core 41, and wound about said core is a heating element 42 of suitable resistance wire.

Removably fitting over the casing 11 at its upper end is a cap 43 secured by a set screw 44 and provided axially of the casing 10 with an opening having a surrounding flange 45. Formed on the cap at its inner side is an arm 46 depending into the chamber 29 and bolted or otherwise fixed to said arm is the insulating base block 47 of a thermostatic switch. Extending through the block near one end thereof is a terminal 48 to which is attached a thermostatic strip 49, and screwed through the block near its opposite end is a terminal 50 to cooperate with the free end of said strip. The strip 49 and terminal 50 are preferably provided with coacting silver contacts 51 while the terminal is further equipped with nuts 52 locking said terminal in adjusted position, the terminal being adjustable for varying the temperature at which the contacts are opened by the thermostatic strip. Snugly fitting within the flange 45 of the cap 43 is the lower section 53 of an approved slip connector, the detachable upper section of which is indicated at 54, and firmly connecting the lower section with the cap is a set screw 55. Extending between the connector section 53 and the socket 39 is a wire 56, and extending between said socket and the terminal 48 is a wire 57 while a wire 58 leads from the terminal 50 back to said section. Connected to the section 54 of the connector is a suitable current supply lead 59, and interposed in said lead is an appropriate switch 60. The contacts 51 are normally closed so that, as will now be seen, when the switch 60 is closed, the heating element 42 will be energized. Accordingly, the casing 10 will be heated for heating the water standing in the chamber 30 and, preferably the casing 10 is coated at its inner side with a dull jet black pigment so that a maximum of the heat radiated from the heating element will be absorbed by said casing and thus communicated to the water. By opening the faucet 38, the heated water may, of course, be drawn from the chamber 30 and since the heated water will rise in said chamber to surround the casing 10 at the level of the thermostatic switch, the heated water will affect the thermostatic strip of said switch so that should the temperature of the water rise above the predetermined point for which the thermostatic switch is set, the strip 49 will be caused to expand and open the contacts 51 for breaking the circuit through the heating element. The possibility of overheating of the device is thus effectually overcome. As will be observed, the jacket formed by the asbestos rope 40 provides a heat resisting seal between the socket 29 and the casing 10 so that heat radiated by the heating element cannot rise upwardly in the chamber 29 to expand the thermostatic strip 49 and effect a false actuation thereof.

Having thus described the invention, what I claim is:

1. An electric water heater including inner and outer casings one providing a heating chamber and the other a surrounding water chamber, a socket disposed in said heating chamber, a core engaged in said socket, a heating element carried by said core for radiating heat to the wall of said inner casing, a thermostatic switch disposed in said heating chamber and controlled by the temperature of the water in said water chamber for de-energizing said element, and a length of insulating rope wound around said socket to frictionally coact with said inner casing for sustaining the socket and forming a heat resisting seal in said heating chamber between said heating element and said switch.

2. An electric water heater including inner and outer casings one providing a heating chamber and the other a surrounding water chamber, the inner casing being open at its upper end, a heating element disposed in said heating chamber for radiating heat to the wall of said inner casing, a cap fitting over the outer casing and provided with an arm projecting through the open end of said inner casing into said heating chamber, and a thermostatic switch mounted upon said arm and controlled by the temperature of the water in said water chamber for de-energizing said heating element.

3. In an electric water heater, the combination of inner and outer tubular casings one providing a heating chamber and the other providing a water chamber surrounding the heating chamber, end plates closing the outer casing, an end plate closing the inner casing at one end, one of the end plates of the outer casing supporting the inner casing at its opposite end and said inner casing being open at the latter end thereof, a cap fitting over the outer casing and closing the inner casing at its open end, and a heating element disposed within said heating chamber for heating the wall of said inner casing.

In testimony whereof, I have hereunto affixed my signature.

CHESTER J. SCANLAN.